United States Patent [19]

Milburn, Jr.

[11] 4,250,871

[45] Feb. 17, 1981

[54] UNITARY STRUCTURE AND METHOD FOR UTILIZING SOLAR ENERGY

[75] Inventor: William W. Milburn, Jr., Boulder, Colo.

[73] Assignee: Thomas W. O'Rourke, Boulder, Colo.

[21] Appl. No.: 970,287

[22] Filed: Dec. 18, 1978

[51] Int. Cl.³ .......................... F24J 3/02; G05D 23/00
[52] U.S. Cl. .................................... 126/430; 126/436; 165/35
[58] Field of Search ............... 126/430, 436, 429, 428, 126/432, 437, 417; 165/35

[56] References Cited

U.S. PATENT DOCUMENTS

| | | | |
|---|---|---|---|
| 2,484,127 | 10/1949 | Stelzer | 126/430 |
| 3,997,108 | 12/1976 | Mason | 126/430 |
| 4,029,258 | 6/1977 | Groth | 126/430 |
| 4,061,267 | 12/1977 | Lof | 126/430 |
| 4,063,546 | 12/1977 | Schmid et al. | 126/436 |
| 4,068,652 | 1/1978 | Worthington | 126/430 |
| 4,071,016 | 1/1978 | Henderson | 126/436 |
| 4,088,266 | 5/1978 | Keyes | 126/430 |
| 4,111,185 | 9/1978 | Swann | 126/436 |

Primary Examiner—James C. Yeung
Assistant Examiner—Daniel O'Connor
Attorney, Agent, or Firm—O'Rourke & Harris

[57] ABSTRACT

A structure and method for utilizing solar energy for heating including a unitary, preferably modular, unit adapted to form an outer surface of a building, and having therein a reservoir suitable for storing fluid heat storage medium. The structure includes an outer glazing, an energy absorbing surface spaced inwardly from the glazing, and a divider forming an absorber channel adjacent the back side of the absorber. Preferably, the storage reservoir is separated from the back side of the absorber by an insulating divider defining the absorber channel. The structure is preferably self-supporting with a stressed storage reservoir and may be incorporated in a structure as a unitary module supporting at least its own weight and often forming a structural, stressed portion of the building. In operation, air may be selectively conducted through the absorber channel to accumulate heat energy from the back side of the absorber and, optionally, conduct the heat energy directly to the building volume to be heated, or over the storage reservoir to accumulate and store the collected energy. When radiant energy is not available, air may be flowed over the storage reservoir to withdraw heat energy to be utilized for heating purposes.

9 Claims, 4 Drawing Figures

UNITARY STRUCTURE AND METHOD FOR UTILIZING SOLAR ENERGY

BACKGROUND OF THE INVENTION

1. Field of the Invention

The present invention relates generally to solar heating systems forming an integral portion of a building, and more particularly to an unusually advantageous solar heating system in which heat is collected and supplied to an integral storage reservoir including a fluid storage medium, the heat being collected by absorption of solar energy utilizing a greenhouse effect, and selectively withdrawn from the storage reservoir and/or from the absorber, by means of internal channels through which air may be selectively conducted.

2. Description of the Prior Art

The ever expanding awareness of the need for greater utilization of solar energy has given rise to a great many systems towards this end. The difficulties and drawbacks of the systems employed to utilize solar energy are not always apparent. For instance, in the so-called active systems, cost is currently an almost overwhelming deterrent. Typical of such multicomponent systems are those utilizing flat plate collectors, usually roof mounted, with fluid (either water or air) circulating systems to mechanically transfer heat from the flat plate collectors to a remote heat storage system, typically a large pile of rocks in the basement. Alternatively, a large tank of water or utectic salts may be employed. Such active systems employ heat storage means which are operated contrary to certain natural tendencies in that heat is collected on the roof and the heated fluid must be moved downward to storage. This necessitates substantial additional equipment and energy to mechanically transmit the heat against this natural thermo siphon flow. Also, the flat plate collectors generally must be supported by the roof or other structural members in the building. Extensive plumbing between the remote heat storage and the collector is required. Once heat is in the storage area, of course, further ducting is required to transmit the heat to the volumes where it is employed.

Other solar energy systems are of the so-called passive designs which are most typically represented by the Trombe Wall. The Trombe system utilizes a wall of thick masonary construction which is faced with glass or other radiant energy transmitting material spaced from the wall to accomplish a greenhouse effect. During the day, solar energy is absorbed and transmitted into the wall by conduction into the masonary. Heat is withdrawn from the wall primarily by convection with air flowing from within the building to the space between the outer surface of the wall and the transparent facing and then again into the structure from the top of the wall. A secondary heating mechanism involves radiant energy from the inner surface of the heated wall. While the Trombe system is most economical in that the masonary wall is usually a structural member of the building it serves, the drawbacks involve rather rapid loss of heat from the outer surface of the wall through cooling of the transparent panels by radiation at night. Heated air flows in contact with the cooled inner surface of the transparent panel. Also, when the interior of the building is warm, the Trombe Wall tends to overheat the building by radiating heat from the inner surface of the wall.

SUMMARY OF THE INVENTION

The present invention, which provides a heretofore unavailable improvement over previous solar energy devices and methods, comprises a method and structure which forms a portion of a building, in which the advantages of the active and passive systems, i.e., efficiency and low cost, respectively, are maintained while the disadvantages of each system are largely avoided. The structure preferably forms an easily handled structural, module unit which directly interfaces with conventional heating systems. The method and structure provide for an absorber having an integral heat storage reservoir adjacent thereto. Heat storage medium may be provided in the heat storage reservoir after the unit is in place. Accordingly, the great mass generally required for heat storage need not be coped with during the construction phase. However, after construction is complete, it is a simple matter to fill the reservoir with a fluid heat storage medium, either a flowable solid, such as a salt, or preferably a liquid, such as water.

More specifically, the structure involves an outer glazing, either single or double, transparent to radiant energy but substantially opaque to energy in the infrared portion of the spectrum. An absorber is positioned adjacent to, but spaced from the glazing with a divider, preferably insulating, defining a channel on the back side of the absorber. Finally, the heat storage reservoir is positioned on the back side of the divider in yet another flow channel. Ducting and dampers are provided to permit selective fluid flow behind the absorber and from there either to the volume to be heated or to the heat storage channel. Alternatively, dampers may be positioned to direct fluid flow over the heat storage reservoir and then through the conventional heating system to the building volume to be heated. Preferably a series of collector-storage units may be formed as modules and connected to a single power unit, though of course each unit may incorporate the ducting and blower of the power unit.

Accordingly, an object of the present invention is to provide a new and improved method and structure for utilizing solar heat which lends to ease of construction by providing for light weight, structural units which incorporate the more massive heat storage medium only after the units are in place.

Another object of the present invention is to provide a new and improved method and structure for utilizing solar energy which combines the heat utilization efficiency and control of an active system while providing many of the cost advantages of an inactive system.

Yet another object of the present invention is to provide a new and improved method and structure for utilizing solar energy in which the solar energy is utilized with a conventional heat distribution system directly from such compact collector-storage structures.

Still another object of the present invention is to provide a new and improved method and structure for utilizing solar energy in which the units are unitary collector-storage units having structural, self-supporting characteristics.

These and other objects and features of the present invention will become apparent from the following description.

DETAILED DESCRIPTION OF THE INVENTION

Figure 1:
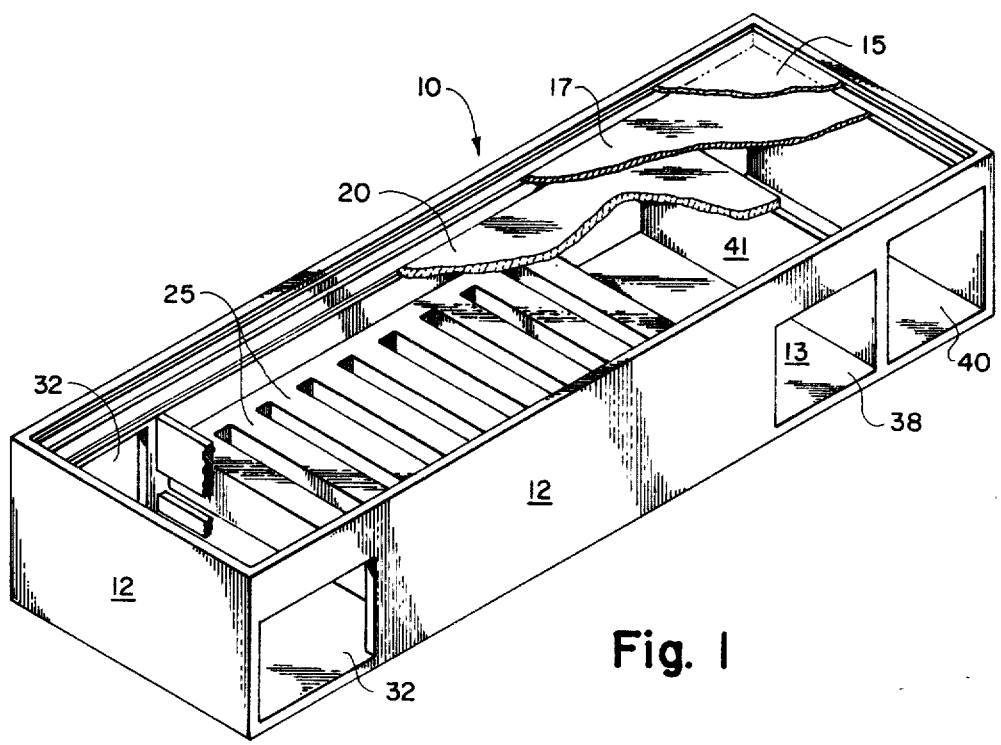
FIG. 1 is a perspective view of a partially cut away, preferred collector-storage module in accord with the instant invention.

Turning now to the drawings, wherein like components are designated by like reference numerals throughout the various figures, a typical collector-storage module for utilizing solar energy for building heating is illustrated in FIG. 1 and generally described by reference numeral 10. As shown, module 10 which may form the surface of a wall or roof of a building, includes side enclosures 12, which may be, for instance, sheet metal, rafters or other structural members of a building (not shown). Preferably side enclosures 12 are free-standing structural units which fit into and support not only module 10 but also lend structural support to the interfacing sections of the building in which module 10 is utilized. Back cover 13 encloses module 12 with side enclosures 12 on five sides.

Figure 2:
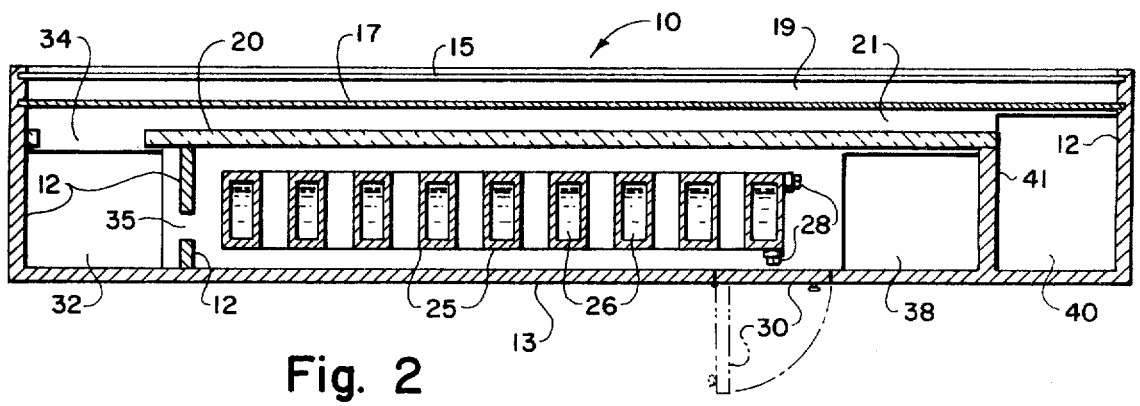
FIG. 2 is a sectioned, side view of the collector storage module of FIG. 1.

At the open side of module 10, glazing 15, which may be glass, polymeric or other such material, is supported. Glazing 15 preferably is transparent or translucent to relatively short wavelength radiation, i.e., ultraviolet radiation as is common in solar energy but opaque to longer wavelength radiation such as infrared radiation which would be admitted by heated surfaces. This well known phenomenon is commonly referred to as the "greenhouse effect". Spaced inwardly from but adjacent to glazing 15 is absorber 17, as is particularly well illustrated in FIG. 2. Glazing 15 and absorber 17 form an insulating void 19 therebetween to minimize heat losses to the environment by conduction through glazing 15. The insulating effect may be enhanced by utilizing double panes of glazing 15 as is well known. Absorber 17 is preferably black at the side facing glazing 15, and may include corrugations to serve as wavetraps and induce turbulence to aid in heat transfer to fluid flowing over the absorber.

Divider 20 defines absorber channel 21 between absorber 17 and divider 20. Divider 20 is preferably of an insulating material, such as a foamed polymer or wood. Heat reservoir channel 23 is defined by, for instance, the other side of divider 20 and back cover 13. Channels 21 and 23 are adapted to flow a heat transport fluid, preferably air. Hollow heat reservoir 25 is disposed within heat reservoir channel 23 and is adapted to contain a fluid heat storage medium 26. Heat reservoir 25 may be, as illustrated, a multi-legged reservoir, or alternatively of a corrugated design to provide a relatively high surface area to enclose volume ratio. While heat reservoir 25 may be of plastic, or other such material, it is preferably formed of metal such as galvanized steel. Strength may be provided by attaching heat reservoir 25 to the side enclosure surfaces 12 of module 10 thus stressing heat reservoir 25. Heat storage medium 26 need only be flowable, i.e., a liquid or granulated material in order that it may be introduced into heat reservoir 25 through inlet 28. Inlets 28 are preferably oriented so as to be accessible through access door 30 defined in back cover 13.

Figure 3:
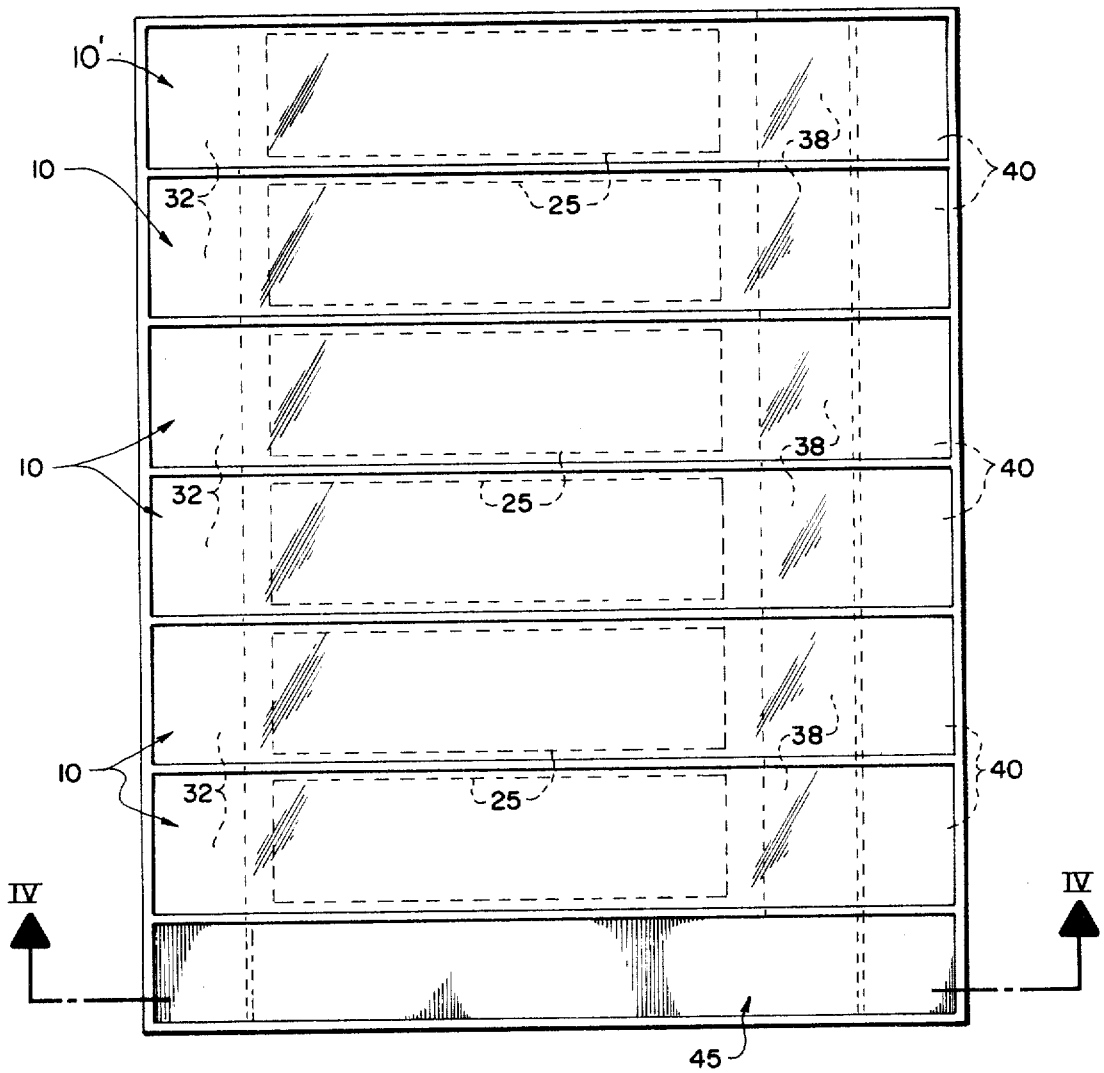
FIG. 3 is a top view of a series of the collector storage modules of FIG. 1 in conjunction with a power module.

Collector-storage module 10 includes a return air duct 32 which is in communication with absorber channel 21 through opening 34 and also in communication with heat reservoir channel 23 to opening 35. Return air duct 32 extends substantially through module 10 except in the instance of an end module 10' as shown in FIG. 3, in which instance duct 32 extends only through one side of module 10'. In this manner, return air duct 32 runs through the length of joined modules 10. Openings 34 and 35 may be of increasing dimensions along joined modules 10 in order to promote relatively equal flow through the modules within large openings 34 and 35 compensating for the more remote location of certain of modules 10. Such sizing is well known and conventional in the art of duct sizing.

Modules 10 and 10' also include heat reservoir duct 38 and absorber duct 40 defined by partition 41 in the end portions thereof in a manner similar to that in which return air duct 32 is formed as described above. Accordingly, when a plurality of modules 10 are joined together with ducts 32, 38 and 40 interfacing, as shown in FIG. 3, and further joined with an end module 10', ducts 32, 38, and 40 form a continuous duct system throughout modules 10 and 10'. While ducts 32, 38 and 49 are illustrated as being formed in the side walls of module 10, external ducting may, of course, be employed. External ducts are useful when modules 10 and 10' are positioned between rafters, thus blocking direct connections between modules 10 and 10'.

Figure 4:
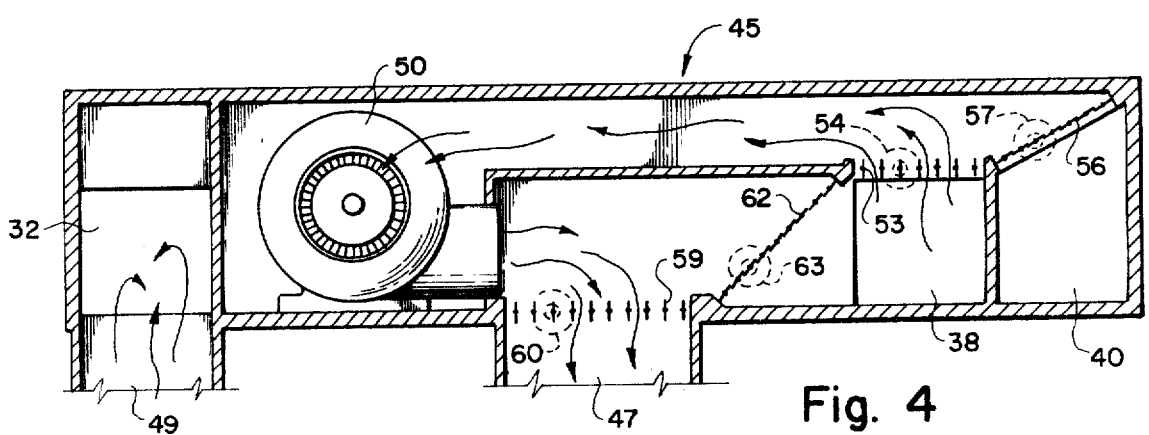
FIG. 4 is a sectional view along section line 4—4 of the power module shown in FIG. 3.

Power unit module 45, as shown in detail in FIG. 4, abuts the end of the ganged collector storage modules 10 and 10' as shown in FIG. 3. With reference to FIG. 4, it is to be noted that power module 45 includes a continuation of return air duct 32, heat reservoir duct 38 and absorber duct 40. Also defined therein are heated air outlet 47 and return air inlet 49. Heated air outlet 47 communicates directly with a conventional heat supply duct system in a building, and return air inlets 49 similarly interface with conventional cold air return. This latter aspect is conventional and not specifically illustrated.

Blower 50 is positioned in power unit module 45 and communicates at the inlet side with heat reservoir duct damper 53, operable by servo 54 and absorber duct damper 56, operable by servo 57. Dampers 53 and 56 may be selectively opened or closed to enable blower 50 to selectively draw heat from heat reservoir 38 and/or absorber duct 40. The outlet of blower 50 communicates with heated air outlet damper 59, operable by servo 60 and heat storage mode damper 62, operable by servo 63. Accordingly, the outlet from blower 50 may be selectively routed to heated air outlet 47, and thus to a conventional heat supply system.

The inlet of blower 50 may be selectively connected to heat reservoir duct 38 and/or absorber duct 40 by appropriate positioning of heat reservoir duct damper 53 and absorber duct damper 56. In this manner, heat may be supplied to the conventional heating system from absorber 17, and/or from heat storage reservoir 25.

In the event heat is available at absorber 17 but not required to heat the subject building, heat storage damper 62 may be opened and absorber duct 56 also opened. This, with the other dampers closed, will induce a closed route circulation from the back side of absorber 17, through absorber duct 40, through blower 50, then through duct 38 to heat storage reservoir 25 and, through opening 34, again past the back side of absorber 17. In this manner, heat is supplied to heat storage medium 26 to be maintained until required to heat the building.

The following table illustrates the more preferred modes of operation:

| | DAMPERS | | | |
|---|---|---|---|---|
| | Heat Reservoir Duct 53 | Absorber Duct 56 | Heat Air Outlet 59 | Heat Storage 62 |
| Heat from absorber to heating system | Closed | Open | Open | Closed |
| Heat from absorber and storage to heating system | Open | Open | Open | Closed |
| Heat from storage to heating system | Open | Closed | Open | Closed |
| Heat from absorber to storage | Closed | Open | Closed | Open |

Power unit module 45 may be positioned in other than the end position by appropriate ducting. Additional blowers may be provided in larger installations.

From the above description, it would be apparent that modules 10, 10' and 45 may be conveniently prefabricated, readily assembled at a building site in place to lend structural support to the building. Rather than providing extensive plumbing and pumps through the building to remote storage, the method and structure described provides for a direct interfacing of the heat collection and storage module with conventional heat distribution means. If desired, hot water may also be provided by interfacing, either directly or through heat exchangers, with the heat storage means. While it is preferred that heated air be employed as the primary heat transfer fluid, hot water may be withdrawn for heating purposes from the reservoir, or merely as a preheat for domestic hot water. Since it is generally contemplated that solar heating systems be sized to provide less than the entire heat load during extremely cold periods or cloudy periods, a backup heating system will generally be provided and may, if desired, be incorporated in the solar collector-storage system described. However, such features are essentially conventional and well within the skill of the art to provide either within the solar collector-storage system as described, or within the conventional heat distribution system. Other conventional features, such as means to vent the absorber in the instance of overheating during, for instance, summer months are contemplated but not specifically disclosed. A temperature responsive damper at the volume between the absorber and glazing serves this end.

In summary, the instant invention provides a method and structure whereby intergal collector-storage modules may be readily handled during construction, preferably lending actual structural support to and forming a surface of the building in which they are employed. The more massive heat storage medium, such as water or a flowable solid, may be added to the otherwise easily handled modules after the modules are in place, and the modules may be directly connected to conventional heat distribution systems without the complication of remote storage of the heat relative to the collector.

Although only limited embodiments of the present invention have been illustrated and described, it is anticipated that various changes and modifications will be apparent to those skilled in the art, and that such changes may be made without departing from the scope of the invention as defined by the following claims.

What is claimed is:

1. A structure for collecting and storing solar energy, the structure comprising:
    an enclosure adapted to be positioned at an exterior surface of a building and having glazing transparent to radiant energy forming at least a portion of one side thereof;
    a collector having a radiant energy absorbing surface positioned within the enclosure adjacent to but spaced from the glazing with the radiant energy absorbing surface disposed towards the glazing;
    an absorber channel defined within the enclosure adjacent the side of the collector opposite that side thereof disposed towards the glazing;
    a heat reservoir channel defined within the enclosure, between the side of the enclosure opposite that having the glazing and the portion of the absorber channel opposite the portion thereof adjacent the collector;
    a heat reservoir in the form of a hollow sealed enclosure positioned within the heat reservoir channel, the heat reservoir having a sealable opening defined therein;
    at least one inlet and at least one outlet opening defined in the enclosure;
    ducting means connecting the heat reservoir channel absorber channel with the inlet opening at one end of the channel, and with the outlet opening at the other end of the channel; and
    selectively positionable damper means disposed between the absorber channel, heat reservoir channel and inlet and outlet openings;
    whereby sensible heat may be generated at the radiant energy absorbing surface of the collector and carried therefrom by fluid flow from the inlet opening through the absorber channel to, selectively, the heat reservoir channel to provide heat to the heat reservoir, or alternatively, to the outlet opening from either the absorber channel or the heat reservoir channel to provide the sensible heat as required.

2. A structure for collecting and storing solar energy as set forth in claim 1 in which the heat reservoir is filled with a flowable heat storage media.

3. A structure for collecting and storing solar energy as set forth in claim 2 in which the heat storage media comprises water.

4. A composite structure for collecting and storing solar energy in which a plurality of structures as set forth in claim 1 are positioned adjacent one another and in which duct means connecting together the absorber channels and the heat reservoir channels of the individual structures are included.

5. A composite structure for collecting and storing solar energy as set forth in claim 4 which further includes blower means communicating with the absorber channel, the heat reservoir channel, the inlet opening, and the outlet opening, and in which the damper means are positioned between the blower and the inlet opening, the outlet opening, the absorber channel and the heat reservoir channel and selectively positionable to induce flow between the inlet opening, through the absorber channel, and to the outlet opening; through the inlet opening, to the heat reservoir channel and to the outlet opening, and through the absorber channel, to the heat reservoir channel, and back to the absorber channel; whereby by proper positioning of the damper means heat may be provided to the outlet opening alternatively from the absorber channel during times of absorption of radiant energy, from the heat reservoir channel when sensible heat is not available at the absorber, and from the absorber channel to the heat reservoir when heat is not required but available at the absorber.

6. A composite structure for collecting and storing solar energy as set forth in claim 5 in which the blower means and the damper means are provided within a power unit module connectable to the module structure by the ducting means.

7. A structure for collecting and storing solar energy as set forth in claim 1 in which the enclosure and heat reservoir are connected and stressed to provide structural strength to the module.

8. A composite structure for collecting and storing solar energy, the structure comprising:
- a plurality of enclosed modules adapted to be supported at an exterior surface of a building with each having glazing transparent to radiant energy forming at least a portion of one side thereof;
- at least one inlet opening and at least one outlet opening defined in each module and positioned to interface with a corresponding opening defined in an adjacent module;
- a plurality of collectors having radiant energy absorbing surfaces and being positioned at least one each within a module adjacent to but spaced from the glazing of such enclosure with the radiant energy absorbing surface disposed towards the glazing;
- a plurality of absorber channels defined at least one each within each module adjacent the side of the collector of such module opposite that side thereof disposed towards the glazing;
- a plurality of heat reservoir channels disposed one each within each module at a position spaced from the collectors and absorber channels;
- a plurality of heat reservoirs in the form of hollow enclosures positioned at least one each within each reservoir channel and having a sealable opening defined therein;
- flowable heat storage media disposed within each heat reservoir;
- at least one outlet vent from the structure;
- ducting means connecting the absorber channels, heat reservoir channels, inlet and outlet openings of each module, and the outlet vent; and
- damper means adapted to control flow from the absorber channels to the heat reservoir channels, or alternatively from the heat reservoir channels to the outlet vent in response to selective positioning of the damper means.

9. A composite structure as set forth in claim 8 which further includes a power module having impeller means positioned therein and connected to the ducting means and thereby to the heat reservoir channels, the absorber channels, and the inlet and outlet openings;
the composite structure further including in the damper means a position thereof to operably connect the blower in a selective manner with the absorber channel, the heat reservoir channel, the inlet and outlet openings, and with the outlet vent.

* * * * *